No. 784,040.  
PATENTED MAR. 7, 1905.
H. M. FELLENZ.  
BEET HARVESTER.  
APPLICATION FILED APR. 27, 1904.
2 SHEETS—SHEET 1.
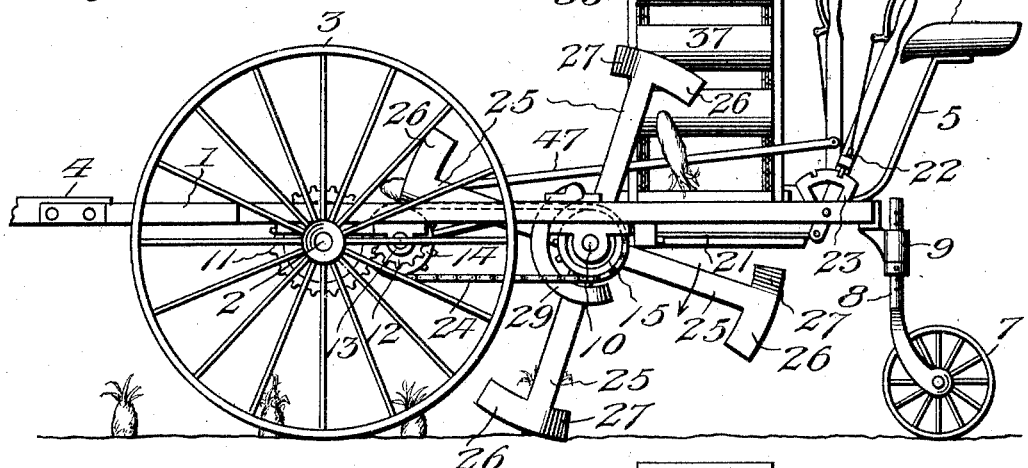
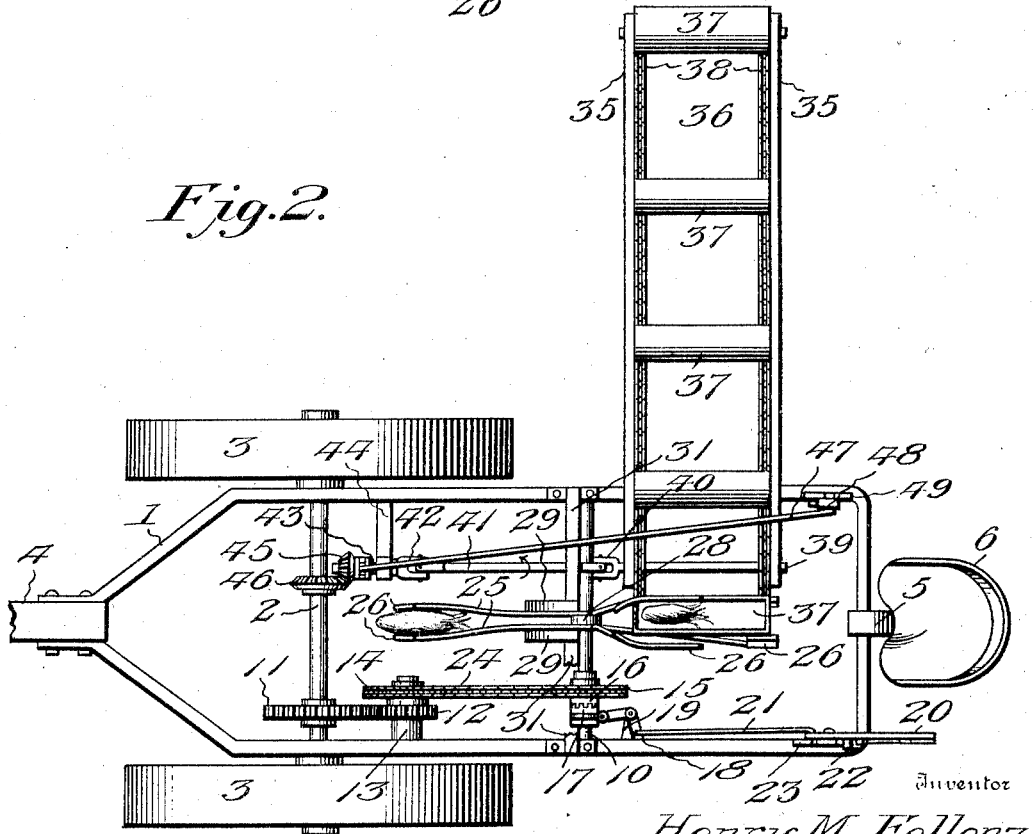
Witnesses  
Edwin F. McKee  
Chas. S. Hyer
Inventor  
Henry M. Fellenz  
By Victor J. Evans  
Attorney No. 784,040. PATENTED MAR. 7, 1905.
H. M. FELLENZ.
BEET HARVESTER.
APPLICATION FILED APR. 27, 1904.

2 SHEETS—SHEET 2.

Witnesses
Edwin G. McKee
Chas. S. Hyer

Inventor
Henry M. Fellenz
By Victor J. Evans
Attorney

No. 784,040.                                    Patented March 7, 1905.

UNITED STATES PATENT OFFICE.

HENRY M. FELLENZ, OF FOND DU LAC, WISCONSIN.

BEET-HARVESTER.

SPECIFICATION forming part of Letters Patent No. 784,040, dated March 7, 1905.

Application filed April 27, 1904. Serial No. 205,197.

*To all whom it may concern:*

Be it known that I, HENRY M. FELLENZ, a citizen of the United States, residing at Fond du Lac, in the county of Fond du Lac and State of Wisconsin, have invented new and useful Improvements in Beet-Harvesters, of which the following is a specification.

This invention relates to beet-harvesters especially adapted for harvesting sugar-beets, but capable of operation in gathering other vegetables or similar growths.

The primary object of the present machine is to simplify the organization of elements and assemble the latter in such positive operative relation that beets or other analogous growths may be expeditiously pulled from the ground and carried upwardly and deposited in conveying means having an outlet adjacent to a receptacle.

A further object of the invention is to provide a harvesting-machine of this class with readily-controlled adjusting means or shifting devices to render the elements directly engaged by and operating with the beets or other vegetables active or inactive.

A still further object of the invention is to provide a strong and durable construction for regularly pulling and elevating the beets or other vegetables and avoid the use of jointed or movable gathering devices which have been found impracticable after wear due to continued operation.

With these and other objects and advantages in view the invention consists in the construction and arrangement of parts which will be more fully hereinafter set forth and subject to a wide range in modification in the proportions, dimensions, and minor details without departing from the spirit of the invention.

Figure 3:
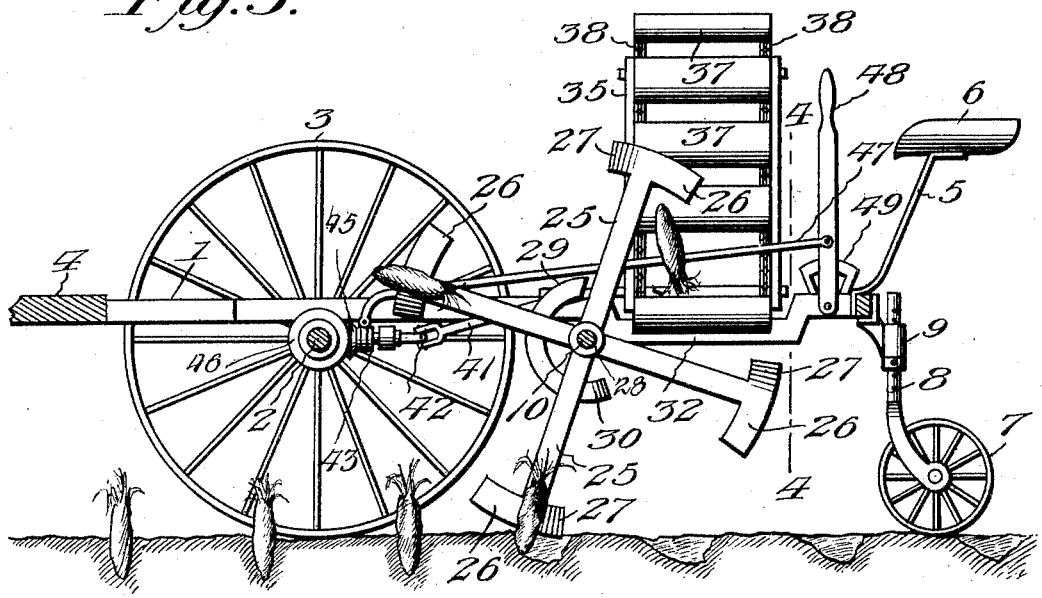
Figure 4:
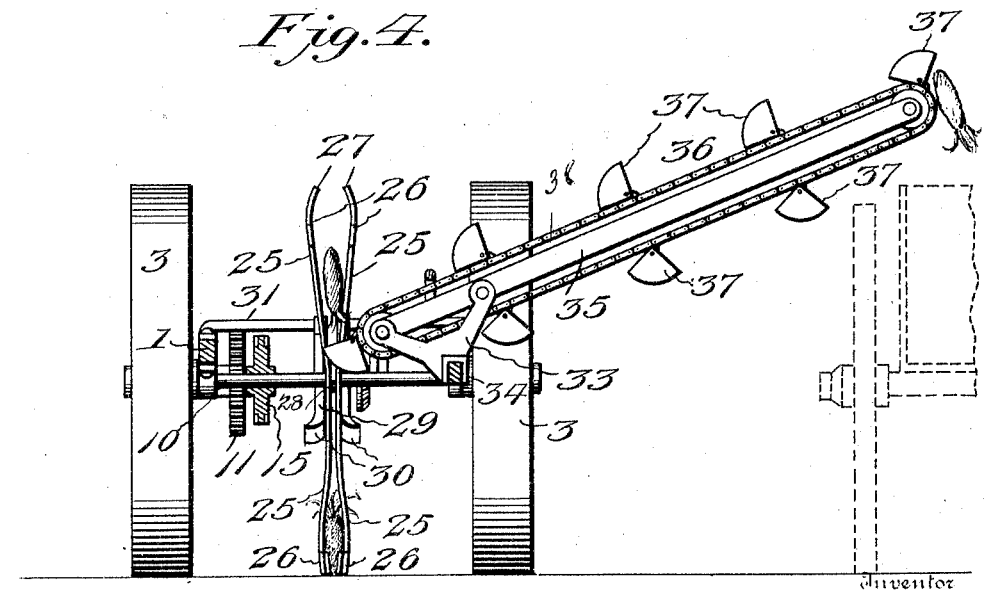

In the drawings, Figure 1 is a side elevation of a harvester embodying the features of the invention. Fig. 2 is a top plan view of the same. Fig. 3 is a central longitudinal vertical section. Fig. 4 is a transverse vertical section on the line 4 4, Fig. 3.

Similar numerals of reference are employed to indicate corresponding parts in the several views.

The numeral 1 designates a frame having an axle 2 engaging the front extremity thereof and provided with ground-wheels 3 of any suitable construction. The front end of the frame is connected to a tongue or other draft means 4, and within and projecting from the frame in rear of the axle 2 are the operating mechanisms which will be hereinafter particularly described. From the center of the rear extremity of the frame 1 a seat-support 5 projects upwardly and has a seat 6 attached thereto, and also connected to the rear extremity of the frame is a swiveled or caster wheel 7, having a stem or shank 8 rising therefrom and vertically held in a socket 9, rigidly fixed to the frame. The vertically-adjustable caster-wheel permits the frame and the gathering mechanism carried thereby to be moved downwardly toward or upwardly from the ground-surface to particularly regulate the depression of the gathering devices with respect to the ground-surface to compensate for varying upward extent of beets or other similar growths above the ground-surface.

Extending across the frame in rear of the axle 2 is a shaft 10, which directly carries and controls the operation of the gathering devices. This shaft is geared up or actuated by the axle 2 in such manner as to cause the gathering devices carried thereby to rotate in the direction of the arrow shown by Fig. 1 and to render the operation of said gathering devices effective. The gearing and connections for operating the shaft 10 from the axle 2 consist of a spur-gear or analogous device 11, fixed on the said axle 2 and held in continual mesh with a pinion 12, rotatably disposed and secured to a stub-axle 13, projecting inwardly from one side of the frame 1 in rear of the axle 2 and having thereon a sprocket-wheel 14. Loosely mounted on the shaft 10 is a sprocket-wheel 15, having a hub 16, provided with clutch devices to engage a slidable clutch-sleeve 17 on the said shaft, the said sleeve being feathered or splined in relation to the shaft to cause the latter to have rotation imparted thereto in the proper direction when the sleeve is thrown into engagement with the hub 16 of the sprocket-wheel 15. The sleeve 17 is connected to a bell-crank lever 18, fulcrumed on a projection 19, extending inwardly from the frame 1 and having a shifting-lever 20 connected thereto by a link-rod 21. The shifting-lever 20 is equipped with the usual sliding dog 22, coöperating with a toothed segment 23. The sprocket-wheels 14 and 15 are engaged by a chain belt 24, and from the foregoing description it will be seen that when the machine or harvester is propelled forwardly the axle 2 has a rotation imparted thereto in a forward direction; but through the medium of the spur-gear 11, pinion 12, sprocket-wheels 14 and 15, and chain belt 24 the shaft 10 is rotated in a reverse direction. Secured to and rotatable with the shaft 10 are gathering devices, consisting of pairs of resilient arms 25, having terminal shoes or grasping elements 26 of segmental form and provided with rear inwardly-bent ends 27 to set up a resistance when the arms are held in clamping or binding relation with respect to each other to prevent the beets or other vegetables from slipping out from between the rear ends of the shoes. By preference the arms each consist of a single strip of resilient material secured at its center to a hub or collar 28, fast on the shaft 10, the said strip having the shoes set forth at opposite ends thereof with the inwardly-bent terminals in reverse position. This preferred construction of the arms is of material importance in manufacture or production of the machine; but it will be understood that as long as the pairs of arms are continued or without joints between the hub or collar 28 and the shoes the intention of the invention will be fully carried out as to these particular elements. The arms 25 coöperate with a pair of segmental compressors or binders 29, having lower rear outwardly-flared ends 30, these compressors or binders being supported in advance of the center of the shaft 10 and held by inwardly-projecting arms 31, having their outer terminals attached to the sides of the frame 1, said arms being arched or elevated, as clearly shown by Fig. 4, to avoid interference with the operation of the sprocket-wheel 15 and chain belt 24 and also to position the compressors or binders at such elevation as to obtain the best results in harvesting the beets or other vegetables.

One of the side members of the frame 1 is formed with a depression 32 near the rear end of the frame and thereover are fitted and secured a pair of yokes 33, longitudinally spaced apart from each other and having lower sockets 34 to fit over the said depressed part of the frame member. The ends of the arms of the yokes 33 are secured to the side bars 35 of a conveyer 36, having loosely secured thereon at regular intervals movable buckets or carriers 37, the latter being attached to chain belts 38, engaging sprocket-wheels at opposite ends of the conveyer. The lower end of the conveyer projects over the frame 1 in close position to the plane of rotation of the arms 25, so that the buckets or carriers 37 will be regularly disposed between and under the arms to receive the beets or vegetables when free from the said arms. The lower sprocket-wheels are secured on a shaft 39, connected at its front end by a universal joint 40 to a coupling-shaft 41, having its front terminal attached by a universal joint 42 to a short counter-shaft 43, held by the inner terminal of a bracket 44, secured to the frame and carrying thereon a slidable pinion 45 of bevel form, which is adapted to engage a bevel-gear 46, secured on the axle 2. The pinion 45 has a shifting-rod 47 attached thereto and projected rearwardly and movably secured to a shifting-lever 48, having the usual locking means coöperating with a segment 49. The conveyer 36 projects outwardly from one side of the frame 1, as shown by Fig. 4, at an upward angle of inclination, and the upper outlet end thereof is adapted to have a wagon-body or other receptive means arranged thereunder and move regularly in a forward direction with the harvester, the said wagon-body or receptive means being replaceable very readily at any time when its capacity has become exhausted relative to the reception of more beets or other vegetables.

In the operation of the machine the gathering devices or arms 25 are rotated and regularly and successively come in close relation to the ground-surface and embrace the beets or vegetables fully just about the time that the said arms pass between the lower rear ends 30 of the compressors or binders 29, the latter forcing the shoes 26 firmly against opposite sides of the beets or vegetables and forcefully pull upwardly on the latter. The shoes are caused to maintain their holding-grip on the beets or other vegetables until the arms reach and pass out from between the upper ends of the binders or compressors and at such time one of the buckets or carriers 37 of the conveyer will be in rear of the liberated arms and in position to receive the released beet or other vegetable, as clearly shown by Figs. 3 and 4. This operation becomes continuous, and it will be understood that the operating mechanisms and several parts including the gathering devices and the carriers of the conveyer will be so positioned, proportioned, and timed in their operation as to arrive at the result sought. When the shoes engage the beets or other vegetables and the arms pass in between the lower ends of the compressors or binders 29, the beets or vegetables are forced backwardly toward the inwardly-bent rear ends of the shoes and become tightly wedged between the latter.

At any time desired the clutch-sleeve 17 may be thrown out of connection relatively to the hub 16 of the sprocket-wheel 15 and the bevel-pinion 45 shifted out of operative relation with respect to the bevel-gear 46 to thereby render both the gathering devices and the conveyer inactive. These unshipping or disconnecting operations may be readily accomplished by the driver or operator while occupying the seat 6, through the medium of the shifting-levers 20 and 48, which are located within easy reaching distance of the seat. It will also be understood that the harvester is disposed in such position relatively to a row of beets or other vegetables as to straddle such row and bring the shoes in engagement with the beets or vegetables, care being taken to cause the gathering devices to operate regularly by first operating one pair of shoes in a slow manner to engage the first beet or other vegetable of the row, and thus cause the successively-operating shoes to regularly take up the beets or other vegetables throughout the entire row. The gathering devices will be spaced apart such distances as to correspond to the intervals between the beets or other vegetables, and in the event that a slight variation exists in such intervals the shoes are long enough to compensate for the difference.

The harvester may be readily transported from one point to another and arranged in operative position, and in view of the simplicity of construction the several contributing elements are rendered durable and are not liable to become disarranged or broken.

Having thus fully described the invention, what is claimed as new is—

In a machine of the class set forth, a frame, a rotatable element therein, pairs of resilient gathering devices held by said element and being capable of movement toward and from each other, each gathering device of each pair being continuous in structure with the diametrically-arranged similar device, pairs of integral shoes on the gathering devices, each pair of shoes having the rear ends thereof inwardly directed toward each other, compressing elements between which the pairs of gathering devices pass during part of their rotation, and by which the two devices of each pair are forced toward each other, a conveyer disposed in rear of the gathering devices, an axle mounted for rotation in the frame, ground-wheels on the axle, mechanism between the axle and rotatable element for rotating the latter in a direction reverse to the axle, mechanism connecting the conveyer and rotatable element, and shifting devices connected to said last-mentioned mechanism, whereby the rotatable element and conveyer may be rendered active or inactive.

In testimony whereof I affix my signature in presence of two witnesses.

HENRY M. FELLENZ.

Witnesses:
 MAY TAYLOR,
 GEORGE M. BOND.